United States Patent
Hughes et al.

(10) Patent No.: US 6,691,029 B2
(45) Date of Patent: Feb. 10, 2004

(54) SYSTEM AND METHOD FOR AUTOMATICALLY GENERATING A THIRD PARTY NOTIFICATION WHEN A TRAVELER IS OVERDUE

(75) Inventors: Duane Curtis Hughes, Round Rock, TX (US); Sarah Blodgett Hughes, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/142,633

(22) Filed: May 9, 2002

(65) Prior Publication Data

US 2003/0212486 A1 Nov. 13, 2003

(51) Int. Cl.$^7$ .............................................. G08G 1/123
(52) U.S. Cl. ..................... 701/204; 701/213; 342/357.1
(58) Field of Search ................................. 701/204, 206, 701/213; 342/357.09, 357.1, 357.17; 455/456.1, 456.3, 456.5, 456.6

(56) References Cited

U.S. PATENT DOCUMENTS

| | | |
|---|---|---|
| 5,422,816 A | 6/1995 | Sprague et al. |
| 5,504,482 A | 4/1996 | Schreder |
| 5,808,565 A | 9/1998 | Matta et al. |
| 5,969,595 A | 10/1999 | Schipper et al. |
| 5,987,377 A | 11/1999 | Westerlage et al. |
| 6,148,261 A | 11/2000 | Obradovich et al. |
| 6,177,905 B1 | 1/2001 | Welch |
| 6,327,533 B1 | 12/2001 | Chou |
| 6,363,323 B1 * | 3/2002 | Jones .......................... 701/213 |
| 6,502,030 B2 * | 12/2002 | Hilleary ...................... 701/207 |
| 6,618,668 B1 * | 9/2003 | Laird .......................... 701/204 |

FOREIGN PATENT DOCUMENTS

WO    WO200041428 A    7/2000

OTHER PUBLICATIONS

IBM Research Disclosure, "Waking up services for preventing "ridden past the station" using mobile phone", No. 445, May 2001, article 172, p. 876.
IBM Application BOC000008US1 "Automated Proximity Notification" pp. 1–21, drawings 1–4.

* cited by examiner

Primary Examiner—Michael J. Zanelli
(74) Attorney, Agent, or Firm—Leslie A. Van Leeuwen; Bracewell & Patterson, L.L.P.

(57) ABSTRACT

A method and system for generating a notification for a third party when a traveler is overdue at one or more waypoints. A traveler or other person specifies waypoints the traveler will pass during a trip. In response to the traveler beginning the trip, a latest arrival time is determined for the first waypoint. If the traveler has not arrived at a waypoint by the determined latest arrival time, a notification is generated for a third party. Conversely, if the traveler reaches the waypoint before the determined latest arrival time, no notification is generated. In either case, if there are remaining waypoints, a latest arrival time is determined for the next waypoint and the process continues.

20 Claims, 9 Drawing Sheets

Welcome Thomas Anderson

Please enter the following information:

Leaving from: | AUSTIN, TX | 702

Traveling to: | HOUSTON, TX | 704

Date of departure: | MAY 5, 2002 | 706

Time of departure: | 9:00 AM | 708

Please enter the maximum travel time between the following waypoints.

Leg 1: AUSTIN to ELGIN    [40 minutes] — 718a

Leg 2: ELGIN to GIDDINGS    [20 minutes] — 718b

Leg 3: GIDDINGS to BRENHAM    [40 minutes] — 718c

Leg 4: BRENHAM to HOUSTON    [40 minutes] — 718d

[DONE] — 720

SYSTEM AND METHOD FOR AUTOMATICALLY GENERATING A THIRD PARTY NOTIFICATION WHEN A TRAVELER IS OVERDUE

BACKGROUND OF THE INVENTION

1. Technical Field

This invention relates to providing notification to a third party in response to a traveler's location, more particularly, to providing notification to a third party in response to a traveler being overdue at one or more waypoints, and still more particularly to using global positioning satellites (GPS) to determine a traveler's location and providing notification to a third party in response to a traveler being overdue at one or more waypoints.

2. Description of the Related Art

There is often someone who should be notified about a deviation from a traveler's itinerary. One example is when a traveler is meeting someone. Considerable inconvenience would be avoided if a notification was sent indicating the traveler will be delayed.

More interestingly, notification that a traveler has not arrived at a particular location as expected is more important based on the characteristics of the traveler and means of travel. A child traveling unaccompanied or an elderly traveler may be greater cause for anxiety than others. Those traveling by private plane or even bicycle have increased risks, and being informed of the lack of progress in a travel itinerary allows the appropriate authorities to be contacted more quickly.

Travelers may use GPS devices as a navigational aid. Currently, selected vehicles contain GPS devices to assist drivers. These devices use an onboard database to determine the current location of the vehicle and to determine the route to a specified destination. These devices offer both a set of directions and en route guidance. When giving en route guidance, the devices are constantly updating the route information. If the driver makes an incorrect turn, the directions are updated. However, current systems do not provide notification to third parties when a traveler has not reached an expected location on a trip.

At this time, interested parties must rely on the ability, memory, schedule, and willingness of the traveler for notification of progress on a trip. Not all travelers have the ability to notify interested parties they will be late. Specifically, a child or elderly traveler may not know to inform interested parties he or she will arrive late.

Therefore, there is a need for an improved method and system for generating a notification for a third party when a traveler is overdue at one or more waypoints.

SUMMARY OF THE INVENTION

As will be seen, the foregoing invention satisfies the foregoing needs and accomplishes additional objectives. Briefly described, the present invention provides an improved method and system for generating a notification for a third party when a traveler is overdue at one or more waypoints.

According to one aspect of the present invention, a method and system for generating a notification for a third party when a traveler is overdue at one or more waypoints is provided. A traveler or other person specifies waypoints the traveler will pass during a trip. In response to the traveler beginning the trip, a latest arrival time is determined for the first waypoint. If the traveler has not arrived at a waypoint by the determined latest arrival time, a notification is generated for a third party. Conversely, if the traveler reaches the waypoint before the determined latest arrival time, no notification is generated.

BRIEF DESCRIPTION OF THE DRAWINGS

The novel features believed characteristic of the invention are set forth in the appended claims. The invention itself, however, as well as the preferred modes of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Referring now to the drawing figures, in which like numerals indicate like elements or steps throughout the several views, the preferred embodiment of the present invention will be described. In general, the present invention provides for generating a notification for a third party when a traveler is overdue at one or more waypoints.

Figure 1:
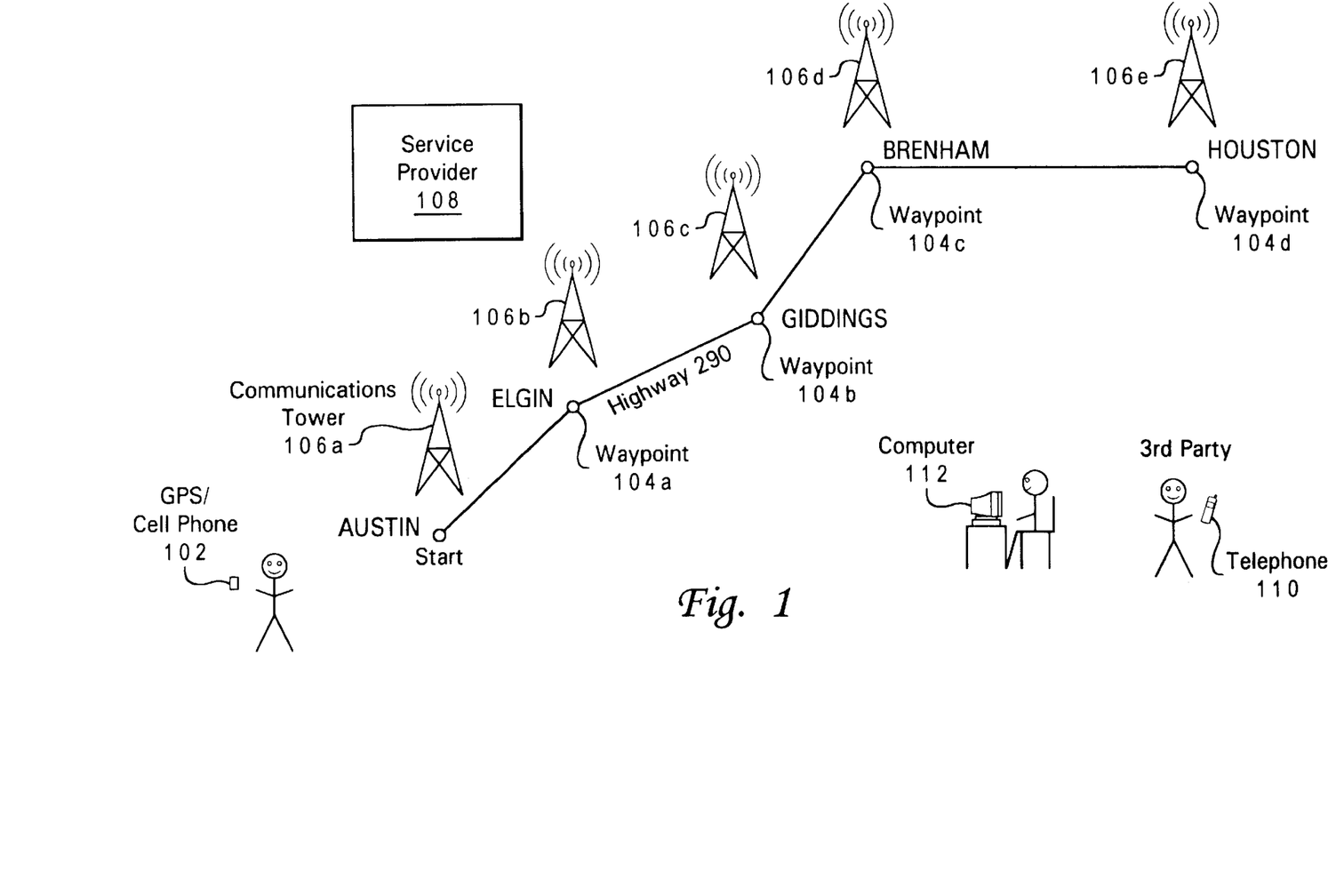
FIG. 1 is a schematic diagram illustrating a cellular network and a travel path depicted by a set of waypoints within which the present invention may find application.

FIG. 1 illustrates an environment in which the present invention may find use. For example, a traveler leaving from Austin to Houston (represented by waypoint 104d) by way of Highway 290 will pass the cities of Elgin, Giddings, and Brenham represented by waypoints 104a–c respectively. As a traveler progresses on a travel path, GPS-enabled cell phone 102 transmits arrival messages to service provider 108 through one of communication towers 106a–e. A GPS-enabled cell phone is a cell phone which may use GPS satellites to obtain the position of the phone. If service provider 108 does not receive an arrival message from GPS-enabled cell phone 102 at one of waypoints 104a–d by a determined latest arrival time for each respective waypoint, service provider 108 generates a notification for specified third parties. The notification provided by service provider 108 is accessible by computer 112 connected to the Internet or supplied by placing a call to telephone 110 and playing a recorded message or both.

For the purposes of the present invention, a service provider is any entity or group of entities which maintains a list of waypoints for a traveler, receives arrival messages from a GPS-enabled cell phone, and provides notification to third parties when a traveler is overdue at a waypoint. For example, a cellular phone service provider may act as a service provider in the present invention. Further, while the example of FIG. 1 depicts land travel, the present invention may find use in travel by land, air, or water. Those skilled in the art will appreciate that the use of a GPS-enabled cell phone is illustrative and that any device capable of transmitting positional information may be used.

Additionally, the positional device may communicate with a service provider without the use of communication towers without deviating from the spirit of the invention.

Figure 2:
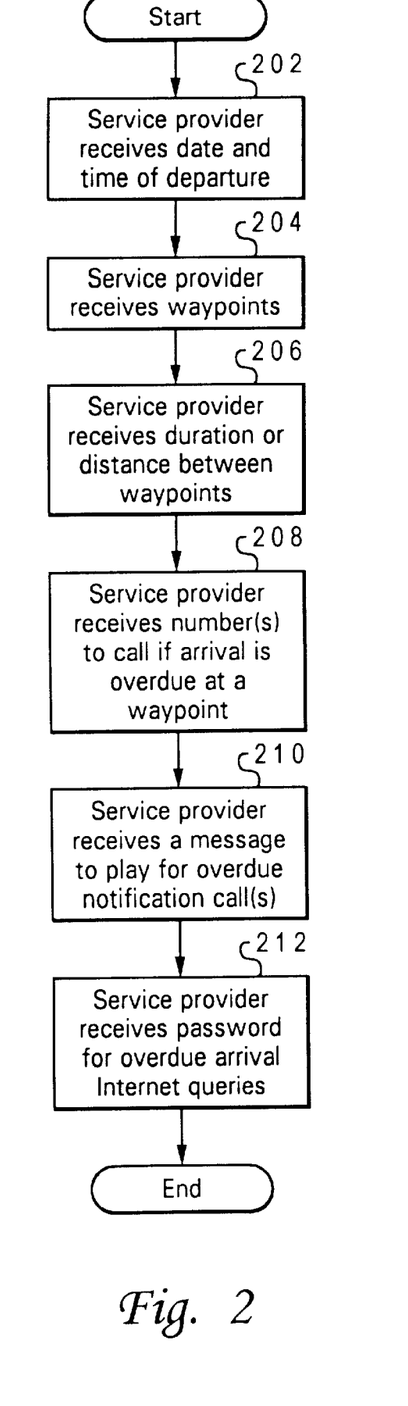
FIG. 2 is a flow chart illustrating one particular set of steps followed by a user to setup waypoints and notification in the claimed invention.

With reference to FIG. 2, a possible set of steps taken by a service provider to setup overdue arrival notification service is illustrated. As depicted at step 202, a service provider receives a date and time of departure for a traveler. Waypoints for the trip are received by the service provider as illustrated at step 204. The duration of each leg of travel, or the distance between waypoints, is received as depicted at step 206. As illustrated at step 208, the numbers to call when arrival is overdue at a waypoint are received by the service provider. The service provider receives a voice or text message to play when overdue notification calls are placed as depicted at step 210. To allow overdue arrival Internet queries, the service provider receives a password as illustrated at step 212. Interested parties, using a website or other similar Internet service, may query the status of a traveler. A party is allowed to view the status of a traveler if the party knows the password the traveler specified when setting up the overdue arrival notification service.

In one embodiment of the invention presented by FIGS. 7a–d, a service provider obtains information about a trip from a user through a website. The website prompts a user to supply a date and time of departure. To obtain a set of waypoints for a trip, the website provides a user a map which the user may select waypoints by computer user input selection means(e.g. using a mouse to "click" on graphically displayed waypoints). In response to a service provider obtaining a set of waypoints for a trip, the website prompts a user for an expected travel time between waypoints. The website prompts a user to supply a password for Internet queries and a message to play for notification calls.

Figure 7A:
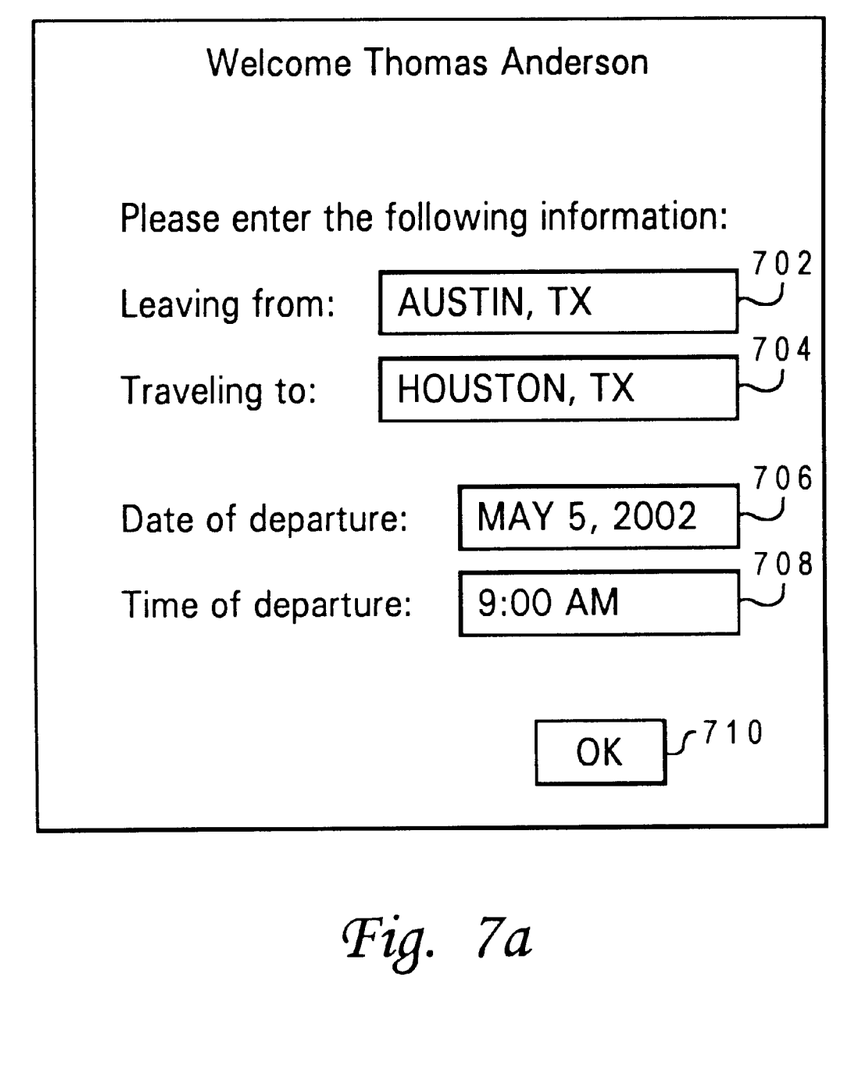
FIG. 7 is a website entry form representing one possible means for a service provider obtaining information from a user to begin overdue notification service.
Figure 7B:
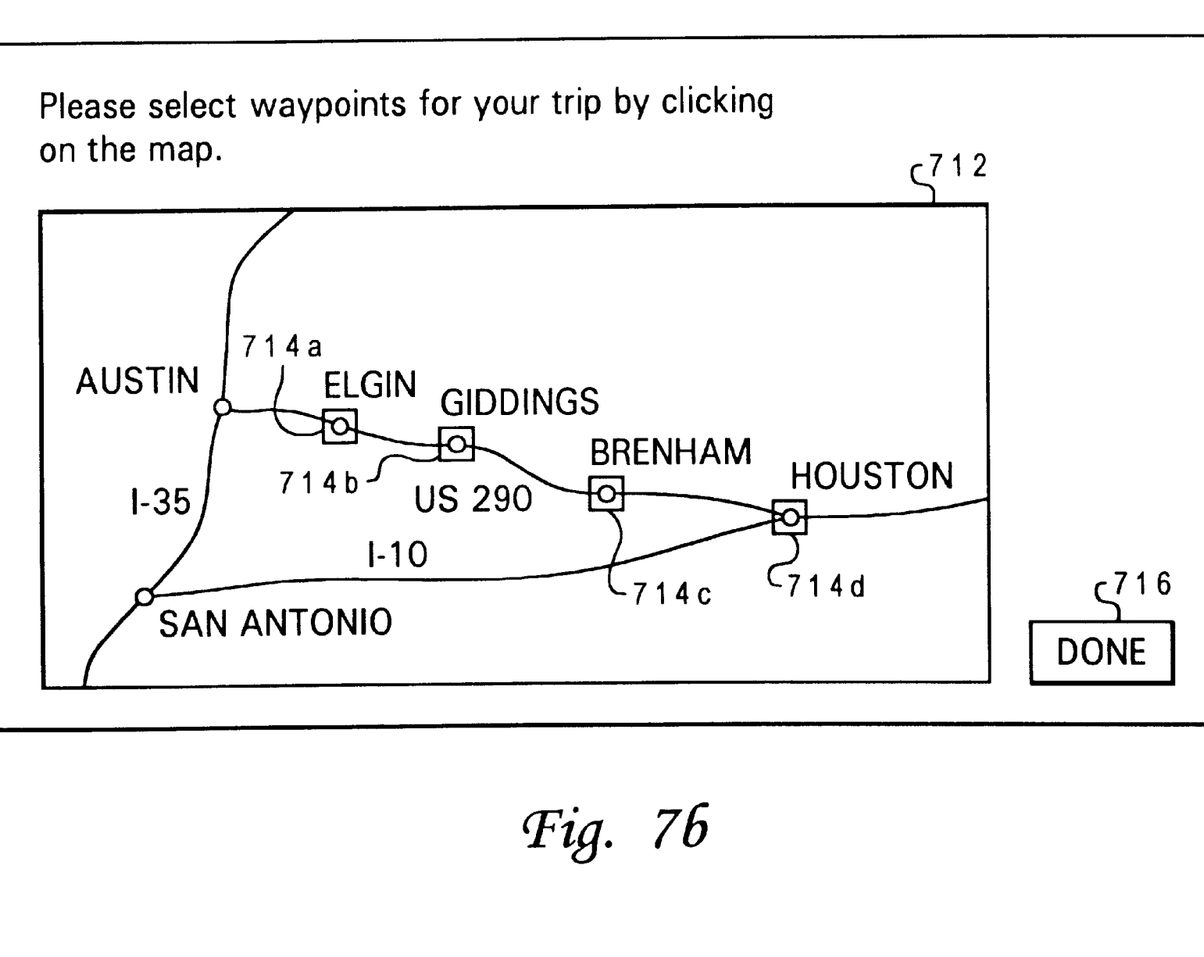

FIGS. 7a–d further depict a possible Internet website a service provider uses to obtain information about a trip from a user is illustrated. After a user logs in, the user enters the location the travel will begin from in entry box 702. Similarly, the user enters the destination of the travel in entry box 704. The date and time of departure are entered by a user in edit boxes 706 and 708 respectively. In response to the user completing entry of the information, the user selects button 710 to continue to the next entry form to select waypoints as depicted in FIG. 7b.

Figure 7C:
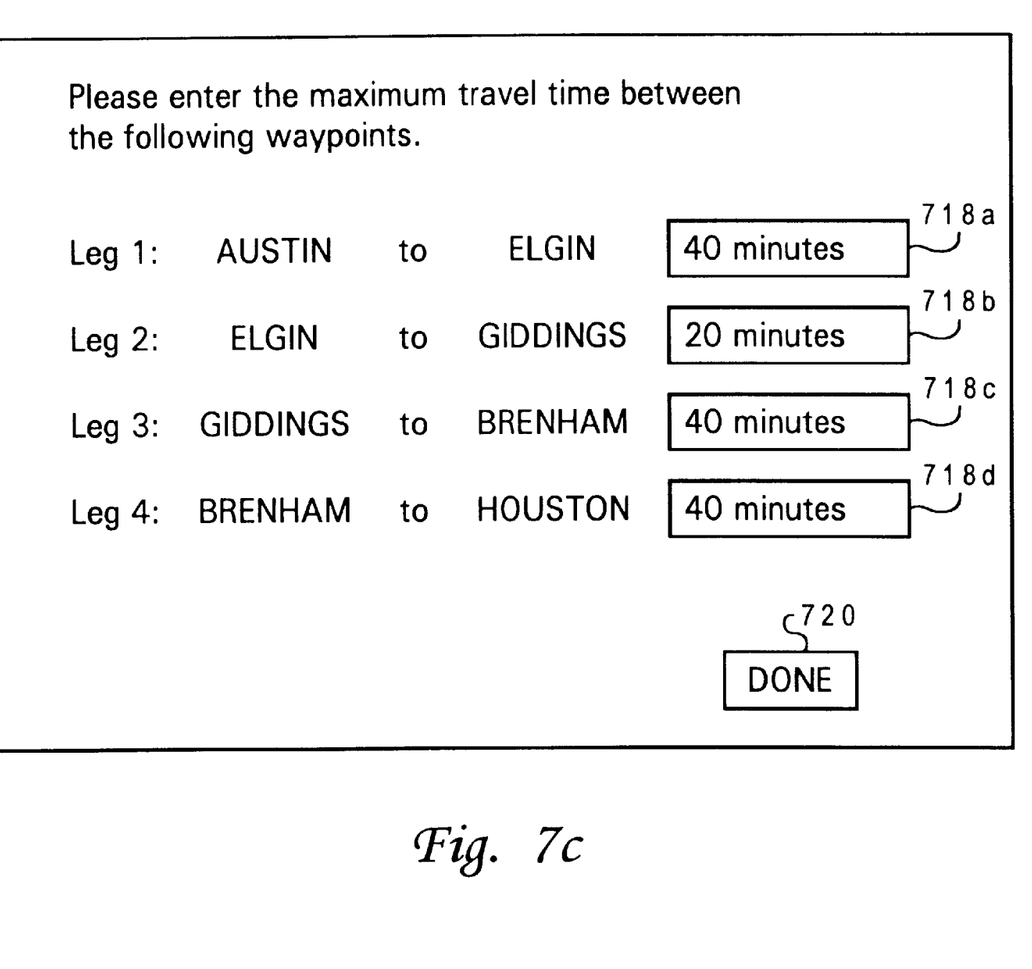

The user is presented map 712 that includes selectable waypoints 714a–d which the user may click to select. For example and continuing with the example from FIG. 1, the user selects Elgin, Giddings, Brenham, and Houston represented by waypoints 714a–d. In response to the user completing entry of the waypoints, the user selects button 716 to continue to the next entry form to enter travel times between the legs of the trip as illustrated in FIG. 7c.

Figure 7D:
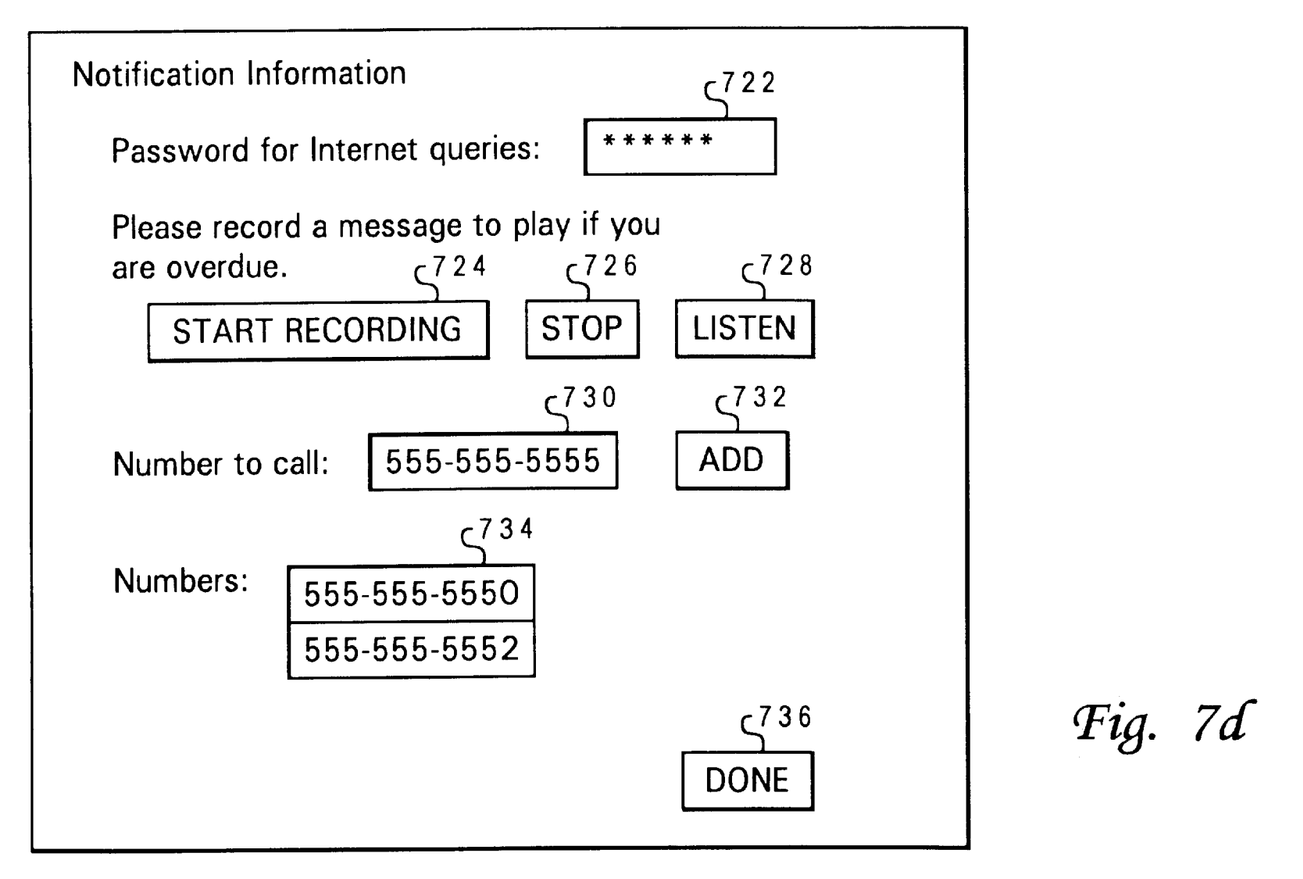

The user enters the expected maximum travel time for each leg corresponding to travel between two consecutive waypoints in entry boxes 718a–d. In response to completing entering the information, the user selects button 720 to continue to the next entry form as depicted in FIG. 7d.

The user enters a password for Internet queries in entry box 722, and by selecting button 724, begins recording a message the service provider will play when placing overdue call notifications. To stop recording the message, the user selects button 726. If the user wishes to listen to the message for review, the user may select button 728. The user enters telephone numbers to call in the event of overdue arrival in entry box 730. The user selects button 732 to add the number to the list of numbers to call which is represented by list 734. Once the user has completed information, the user selects button 736 to complete the process of setting up overdue arrival notification.

Those skilled in the art will appreciate that a user may use a cellular phone, Internet website, or telephone to specify the information for setting up overdue arrival notification service without departing from the spirit of the present invention. The means of specifying waypoints also includes a service provider presenting a user with a list of pre-defined waypoints, allowing entry of latitude and longitude to describe waypoints, and specifying waypoints based on a relative bearing and distance from known waypoints. Further, the overdue arrival notification information may be automatically generated when purchasing travel tickets. For example, when a user purchases tickets, the ticket agency may obtain a message to play on overdue arrival and an Internet query password. Already knowing the travel path, the ticketing agency may then send waypoint information to a service provider.

Figure 3:
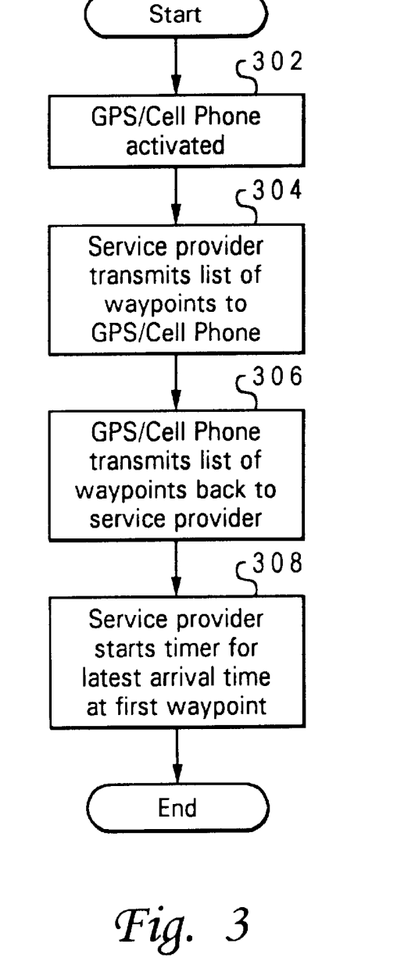
FIG. 3 is a flow chart depicting a possible set of steps taken by a service provider and GPS-enabled cellular phone to initiate notification service.

Referring to FIG. 3, one particular set of steps undertaken by a GPS-enabled cellular phone (GECP) and a service provider to initialize notification service is depicted. As illustrated at step 302, a GECP is activated prior to the start of travel allowing for communication with a service provider. A service provider transmits a list of waypoints for a trip to a GECP as depicted at step 304. The transmitted list includes positional information for each of the waypoints to be encountered during a trip and allows a GECP to know when to transmit arrival messages to a service provider. In response to receiving the waypoint list, a GECP transmits the waypoint list back to a service provider allowing a service provider to determine if the list was received successfully as illustrated at step 306. A timer is started by a service provider for the latest arrival time at the first waypoint as depicted at step 308.

A person of ordinary skill in the art understands that a GECP may be automatically activated by way of a signal from a service provider or an alarm event set for the time the trip is to begin or manually by a traveler. In addition, any means that allows for verifying the GECP received the waypoint list successfully may be used in place of the GECP transmitting the list back to the service provider. For example, the original transmission from the service provider may contain a checksum and the list may be validated by the GECP, with the GECP transmitting a received successfully message to the service provider upon verification.

Figure 4:
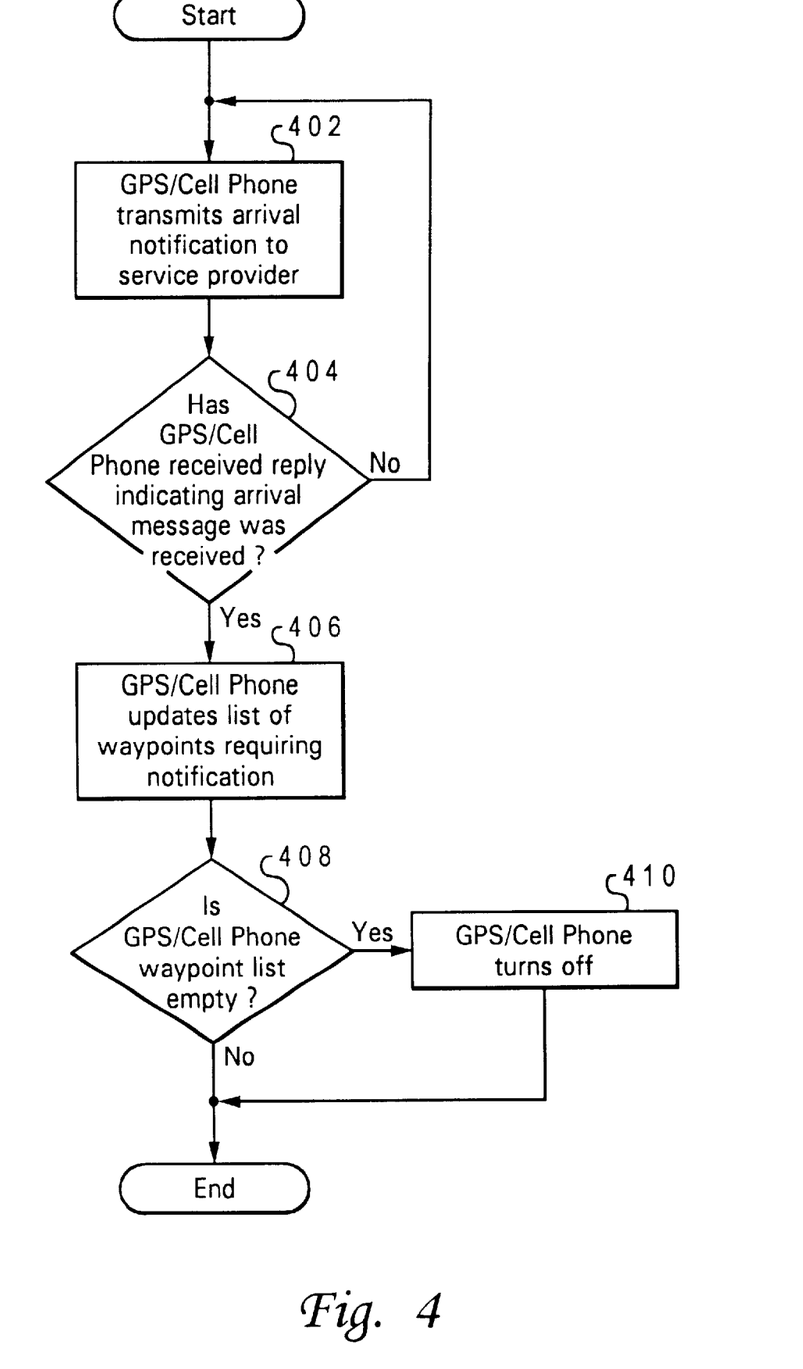
FIG. 4 is a flow chart illustrating one particular set of steps taken by a GPS-enabled cellular phone when a traveler arrives at a waypoint.

With reference to FIG. 4, a possible set of steps taken by a GECP when a traveler arrives at a particular waypoint is illustrated. Upon arriving at a waypoint, a GECP transmits an arrival message to a service provider as depicted at step 402. A GECP waits for a reply from a service provider indicating the arrival message was received as illustrated at step 404. If after waiting and no reply is received by the GECP over a specified period, a new arrival message is transmitted to the service provider. In response to the GECP receiving a reply message from a service provider, the GECP updates its list of waypoints requiring notification by removing the current waypoint from this list of waypoints requiring notification as depicted at step 406. As illustrated at step 408, the GECP determines if its waypoint list is empty. If the list is empty, the GECP deactivates as depicted at step 410. Otherwise, the GECP remains active, awaiting arrival at the next waypoint.

The amount of time a GECP waits for a reply from a service provider may be a specified length of time or vary as a function of remaining battery life of the GECP or of the quality of the communication channel between the GECF and service provider. The form and contents of the arrival message transmitted by the GECP is immaterial provided that a service provider may identify the traveler and waypoint at which the traveler has arrived. Similarly, the form and contents of the reply message transmitted by the service provider are immaterial provided the GECP may determine the service provider received the arrival message. Further, the GECP may stop or suspend until a later time sending arrival message to a service provider when no reply message is received without deviating from the spirit of the invention.

Figure 5:
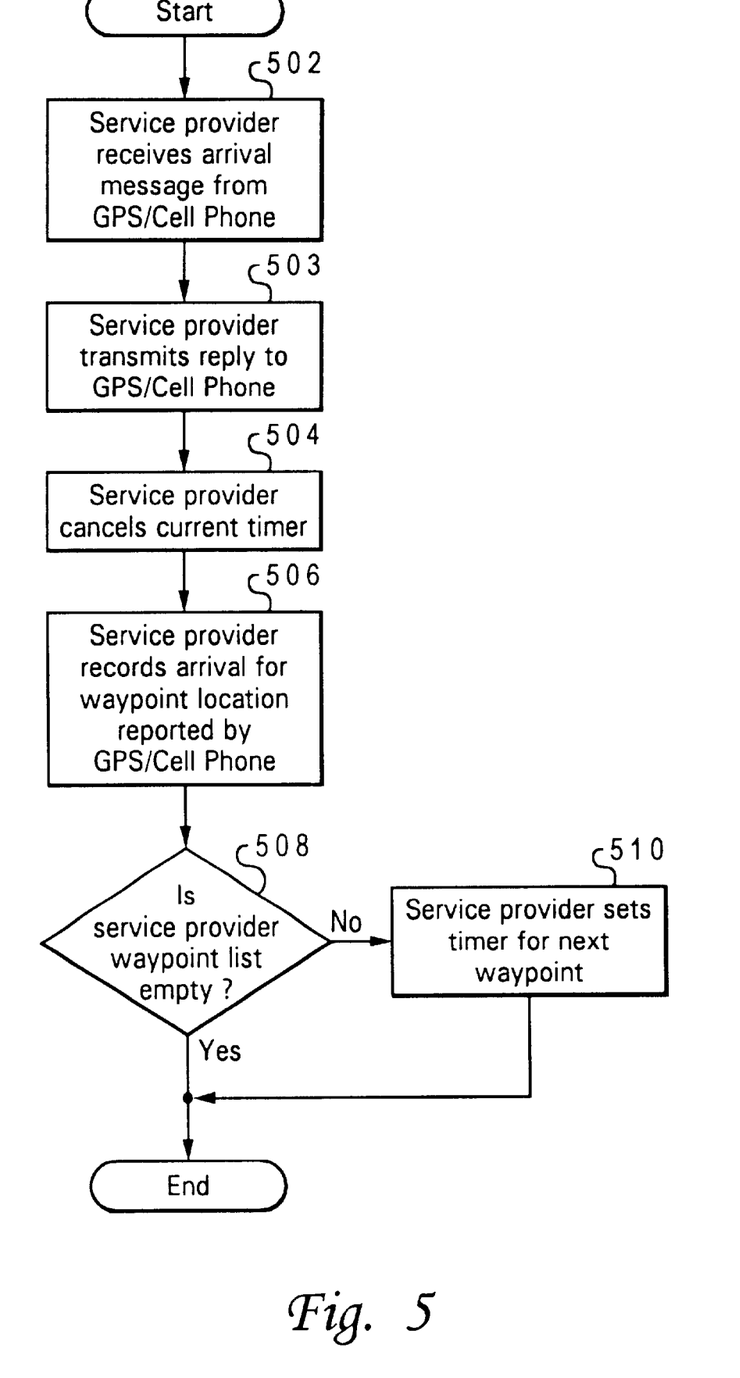
FIG. 5 is a flow chart depicting a possible set of steps taken by a service provider when a traveler arrives at a waypoint.

Referring to FIG. 5, one possible set of steps taken by a service provider when a traveler arrives at a particular waypoint is depicted. As illustrated at step 502, a service provider receives an arrival message from a GECP indicating arrival at the particular waypoint. In response to receiving an arrival message from a GECP, a service provider transmits a reply message to the GECP to indicate successful receipt of the arrival message as depicted at step 503. The timer for the current leg of the trip maintained by the service provider is cancelled as illustrated at step 504. Arrival for the waypoint reported by the GECP is recorded by the service provider as depicted at step 506. The list of waypoints for the traveler is examined by the service provider to determine if there are remaining waypoints that require overdue arrival notification as illustrated at step 508. If any waypoints remain, the service provider sets a timer in accordance with maximum expected travel time to the next waypoint as depicted at step 510.

Out-of-order arrival may result from a traveler taking a different route or from a service provider not receiving arrival notification for a waypoint. If a traveler arrives at waypoints out-of-order, a service provider records arrival for all waypoints prior to the current waypoint. For example, consider the travel path given in the discussion of FIG. 1. If a traveler arrives at Giddings without arrival being recorded for Elgin, arrival at the Elgin and Giddings waypoints will be recorded.

Figure 6:
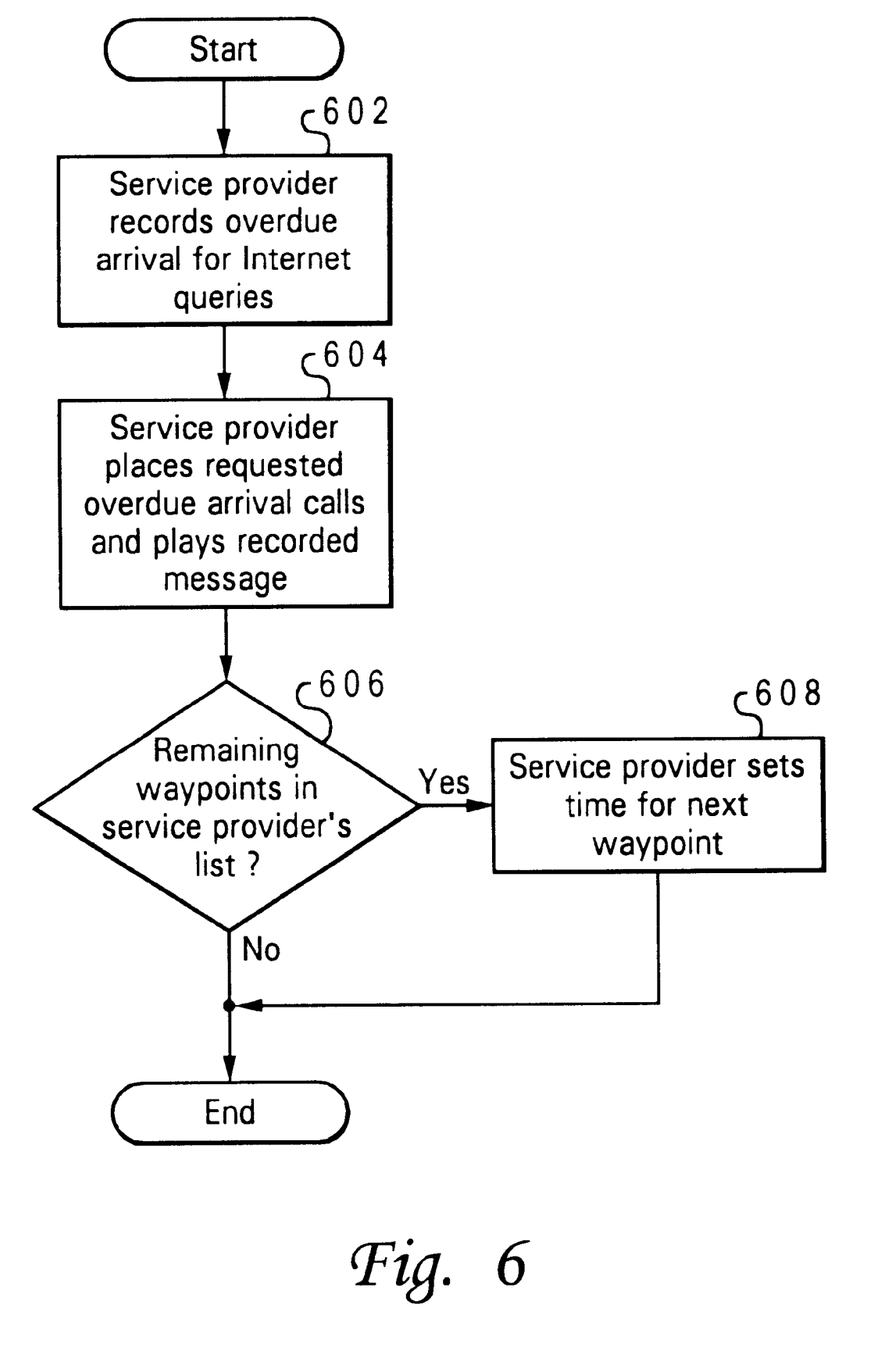
FIG. 6 is a flow chart illustrating one particular set of steps taken by a service provider when a traveler is overdue at a waypoint.

FIG. 6 illustrates a possible set of steps taken by a service provider when a traveler is overdue at a waypoint. A traveler is overdue at a waypoint when the specified latest arrival time for a waypoint has passed and the arrival message for the waypoint has not been received. As depicted at step 602, the service provider records the overdue arrival for Internet queries. The numbers to call specified by the user are placed by the service provider and the specified message is played as illustrated at step 604. The service provider determines if there are remaining waypoints for the traveler by examining the waypoint list as depicted at step 606. If waypoints remain, the service provider starts a timer for the next waypoint using the maximum expected travel time from the current waypoint to the next waypoint as illustrated at step 608.

The present invention has been described in relation to particular embodiments which are intended in all respects to be illustrative rather than restrictive. Alternative embodiments will become apparent to those skilled in the art to which the present invention pertains without departing from its spirit and scope. For example, although the present invention has been described in accordance with a GPS-enabled cell phone and a service provider, it will be appreciated that the systems and principles described herein may also be useful in conjunction with other positioning technologies. Further, the traveler in the present invention has been described as a human traveler, however, the traveler may be cargo or other animate or inanimate objects, such as pets, racing animals, or other livestock.

The present invention has obvious uses as a mechanism to track local events that are of interest to a broader group of people, but that do not attract media attention. For example, a road rally or a long-distance trip by a church group or by people with disabilities. The password required for Internet access to the travel itineraries for such groups might be waived so that any interested party could check on the progress of the group or of individuals within it.

Also, the present invention has use for competitions that include travel through remote regions where it is impractical to have monitors present. Overdue arrival notifications could trigger activities to contact participants to ensure their safety or notifications to officials that there may be a need to verify that the intended course of the competition was followed.

Accordingly, the scope of the present invention is defined by the appended claims rather than the foregoing discussion.

What is claimed is:

1. A system for generating a third party notification when a first party traveler is overdue at one or more waypoints, said system comprising:

means for specifying said one or more waypoints;

means for determining an overdue time for each of said one or more waypoints;

means for determining if said traveler has not arrived at any of said one or more waypoints by a respective overdue time; and means for notifying an external third party in response to determining that said traveler has not arrived at any of said one or more waypoints by said respective overdue time, wherein said external third party is different from service provider personnel affiliated with a service provider that comprises a computer facility which issues said third party notification.

2. The system as described by claim 1, wherein said means for determining if said traveler has not arrived at any of said one or more waypoints by said respective overdue time comprises processing means within a GPS-enabled cell phone capable of sending an arrival message to a service provider in response to said GPS-enabled cell phone arriving at any of said one or more waypoints.

3. The system as described by claim 1, wherein said means for determining if said traveler has not arrived at any of said one or more waypoints by said respective overdue time further comprises processing means within said service provider for: a) setting a timer to said respective overdue time for one of said waypoints, b) canceling said timer in response to receiving an arrival message from a GPS-enabled cell phone, and c) in response to not receiving said arrival message before said timer expires, determining said traveler is overdue.

4. The system as described by claim 1, wherein said means for specifying one or more waypoints comprises one of a plurality of mechanisms from among an Internet website that displays a map on which said waypoints are specified and a telephone.

5. The system as described by claim 1, wherein said means for notifying said third party comprises means for placing a call to one or more specified numbers and playing a specified message.

6. The system as described by claim 1, wherein said means for notifying said third party comprises a password-protected website displaying overdue notifications for said traveler.

7. The system as described by claim 6, wherein said password-protected website includes actual arrival times for the waypoints said traveler has reached.

8. The system as described by claim 6, where in said password-protected website includes revised expected times for said waypoints based on actual progress of said traveler.

9. A method for generating a third party notification when a traveler is overdue at one or more waypoints, said method comprising the steps of:
specifying said one or more waypoints;
determining an overdue time for each of said one or more waypoints;
determining if said traveler has not arrived at any of said one or more waypoints by said respective overdue time, said determining including receiving signals at a central computer facility of a service provider from a GPS-enabled device located proximate to the traveler; and
notifying a third party subscriber in response to determining that said traveler has not arrived at a most recent one of said one or more waypoints by said respective overdue time, wherein said third party subscriber has an account with said central computing facility that includes a password for accessing said third party notification.

10. The method of claim 9, wherein said step for determining if said traveler has not arrived at any of said one or more waypoints by said respective overdue time further comprises:
receiving an arrival message at a service provider in response to a GPS-enabled cell phone arriving at any of said one or more waypoints;
setting a timer to said respective overdue time for one of said waypoints;
canceling said timer in response to receiving said arrival message from said GPS-enabled cell phone; and
in response to not receiving said arrival message before said timer expires, determining said traveler is overdue.

11. The method of claim 9, wherein:
said step for specifying one or more waypoints includes one of a plurality of methods from among (1) displaying a map on an Internet website and receiving waypoint information and (2) receiving information via a telephone; and
said step for notifying said third party includes one of a plurality of methods from among (1) displaying overdue notifications for said traveler via a password-protected website, such that said third party may access said website to review said overdue notifications and (2) placing a call to one or more specified numbers associated with the third party and playing a specified message.

12. A method for generating a third party notification when a traveler is overdue at one or more waypoints, said method comprising the steps of:
specifying said one or more waypoints;
determining an overdue time for each of said one or more waypoints;
determining if said traveler has not arrived at any of said one or more waypoints by said respective overdue time; and
notifying an external third party in response to determining that said traveler has not arrived at any of said one or more waypoints by said respective overdue time, wherein said external third party is not an internal personnel of a service provider that issues said third party notification.

13. The method as described by claim 12, wherein said step for determining if said traveler has not arrived at any of said one or more waypoints by said respective overdue time comprises:
sending an arrival message to a service provider in response to a GPS-enabled cell phone arriving at any of said one or more waypoints;
setting a timer to said respective overdue time for one of said waypoints;
canceling said timer in response to receiving said arrival message from said GPS-enabled cell phone; and
in response to not receiving said arrival message before said timer expires, determining said traveler is overdue.

14. The method as described by claim 12, wherein said step for specifying one or more waypoints comprises displaying a map on an Internet website and receiving waypoint information.

15. The method as described by claim 11, wherein said step for specifying one or more waypoints comprises receiving information via a telephone.

16. The method as described by claim 11, wherein said step for notifying said third party comprises placing a call to one or more specified numbers and playing a specified message.

17. The method as described by claim 11, wherein said step for notifying said third party comprises displaying overdue notifications for said traveler via a password-protected website.

18. A computer program product comprising:
a computer readable medium; and
computer program code on said computer readable medium for generating a notification for a third party when a traveler is overdue at one or more waypoints, wherein said third party is notified via a mechanism for notification external/remote to a computer system on which said program code is executing, said computer program code further comprising:
computer program code for specifying said one or more waypoints;
computer program code for determining an overdue time for each of said one or more waypoints;
computer program code for determining if said traveler has not arrived at any of said one or more waypoints by said respective overdue time; and
computer program code for notifying said third party in response to determining that said traveler has not arrived at any of said one or more waypoints by said respective overdue time, wherein said program code initiates a remote notification to an external third party.

19. The computer program product as described by claim 18, wherein said computer program code for determining if said traveler has not arrived at any of said one or more waypoints by said respective overdue time comprises:
computer program code for receiving an arrival message at a service provider in response to a GPS-enabled cell phone arriving at any of said one or more waypoints; and
computer program code for setting a timer to said respective overdue time for one of said waypoints;
computer program code for canceling said timer in response to receiving said arrival message from said GPS-enabled cell phone; and
computer program code for, in response to not receiving said arrival message before said timer expires, determining said traveler is overdue.

20. The computer program product of claim 18, further comprising program code for displaying overdue notifications for said traveler via a password-protected website that is accessible by said third party.

* * * * *